United States Patent [19]

Hunwicks

[11] 3,926,397

[45] Dec. 16, 1975

[54] VEHICLE SEAT SLIDES

[75] Inventor: Alec Alfred Hunwicks, Northampton, England

[73] Assignee: Brown Brothers Engineering Limited, Northampton, England

[22] Filed: Aug. 2, 1974

[21] Appl. No.: 494,372

[30] Foreign Application Priority Data
Aug. 13, 1973  United Kingdom............... 38323/73

[52] U.S. Cl. ............................................... 248/430
[51] Int. Cl.² ......................................... B60M 1/08
[58] Field of Search................... 248/430, 429, 424; 308/3.8

[56] References Cited
UNITED STATES PATENTS

| | | | |
|---|---|---|---|
| 1,969,353 | 8/1934 | Chapman............................ | 248/429 |
| 2,307,305 | 1/1943 | Saunders et al. ................... | 308/3.8 |
| 2,351,778 | 6/1944 | Moulding............................ | 248/430 |
| 2,647,558 | 8/1953 | Rappl................................. | 248/430 |
| 2,708,959 | 5/1955 | Dingman et al. ................... | 308/3.8 |
| 2,780,501 | 2/1957 | Rosenberg.......................... | 248/430 |
| 2,805,701 | 9/1957 | McCormick........................ | 248/430 |
| 2,917,350 | 12/1959 | Ragsdale............................. | 248/430 |
| 3,501,121 | 3/1970 | Lautenbach........................ | 248/430 |
| 3,685,872 | 8/1972 | Babbs................................. | 248/430 |

FOREIGN PATENTS OR APPLICATIONS

| | | | |
|---|---|---|---|
| 327,747 | 4/1930 | United Kingdom................. | 248/429 |
| 648,183 | 1/1951 | United Kingdom................. | 248/429 |
| 942,976 | 11/1963 | United Kingdom................. | 248/429 |
| 1,349,006 | 2/1963 | France................................ | 248/430 |

*Primary Examiner*—Marion Parsons, Jr.

[57] ABSTRACT

A slide mechanism, particularly for a vehicle seat, comprises an upper channel having a base secured to the vehicle seat, and a lower channel having a base secured to the vehicle floor, and the channels have limbs which are shaped to interlock to resist separation of the channels; sets of rollers are preferred to be located between the channels and, under abnormal loading, the channel limbs are adapted to deform around the rollers.

8 Claims, 5 Drawing Figures

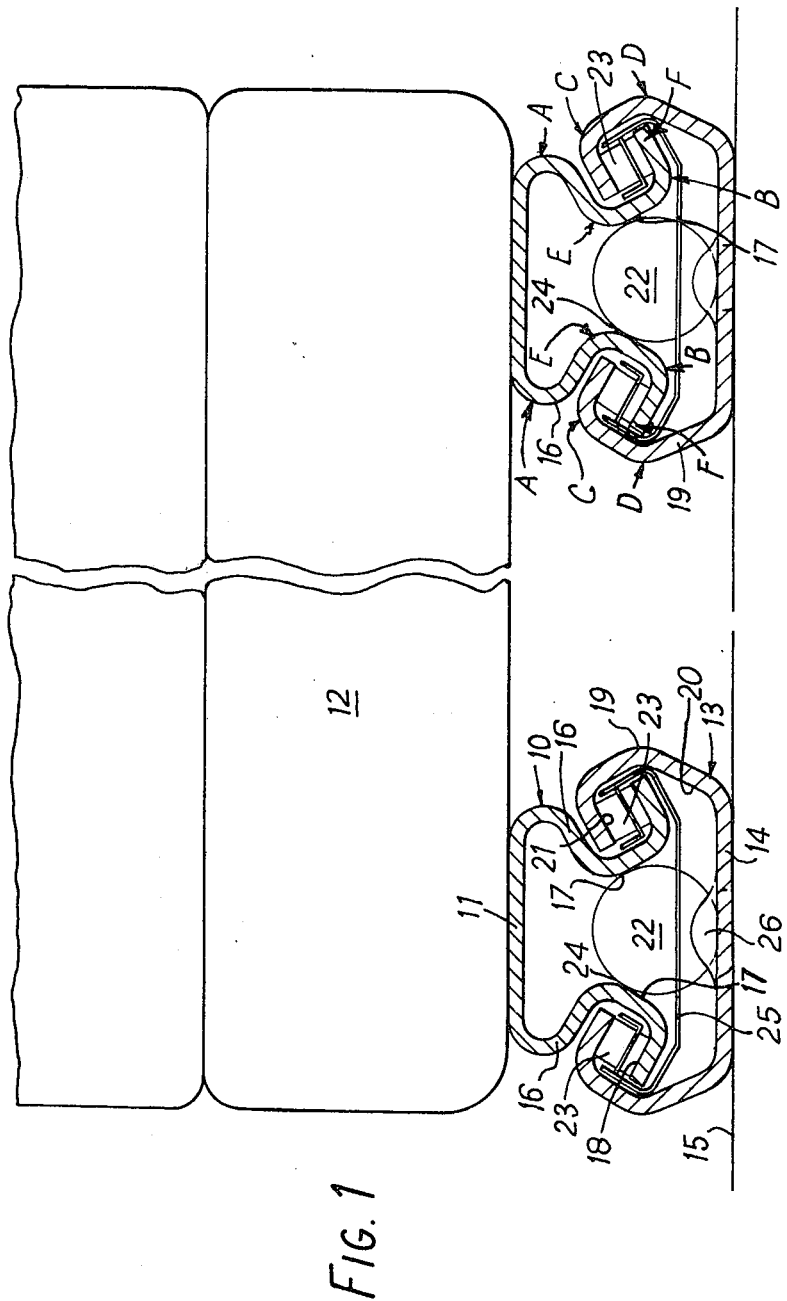

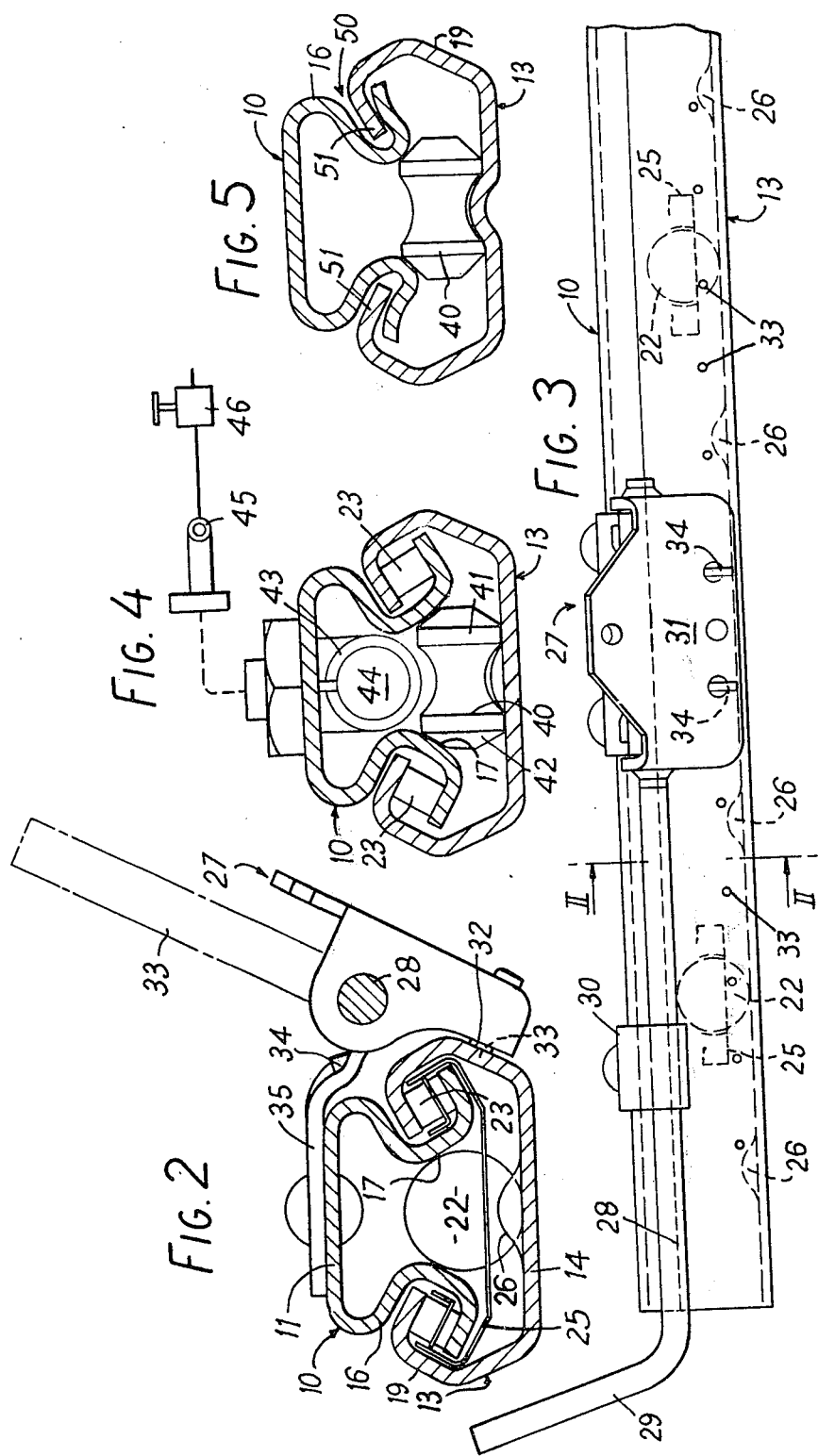

3,926,397

VEHICLE SEAT SLIDES

BACKGROUND OF THE INVENTION

This invention relates to slide mechanisms, particularly for the seats of vehicles such as automobiles, aircraft, heavy goods vehicles, locomotives, etc.

Adjustable seat slide mechanisms are, of course, well known in, for example, automobiles where the seat is longitudinally adjustable by the occupant, and various mechanisms have been proposed for achieving smooth running of the slides and adjustment of the seat position with a minimum of effort. However, particularly in view of current legislation relating to vehicle seat belts, whereby the belt anchorage points should move with the seats and provide passive restraint, it is becoming increasingly important to ensure that the slide mechanisms have sufficient strength to resist bursting on impact due to vehicle collision. The slide mechanisms usually comprise upper and lower channels which slide relatively to one another and which are held in selected positions by latching devices. In slide mechanisms of this kind, bursting can occur either by separation of the slides or by fracture of the latching devices.

It is one object of the present invention to provide an improved seat slide mechanism of the above kind.

SUMMARY OF THE INVENTION

According to the present invention, there is provided a slide mechanism comprising a first channel having a base arranged to be secured to a movable member, and a second channel in sliding engagement with the first channel and having a base arranged to be secured to a stationary member, characterised in that one of said channels has limbs which extend inwardly and then outwardly to provide a pair of recesses, and the other of said channels has limbs which extend inwardly to enter said recesses and so interlock to resist separation of the channels.

Suitably, said recesses are angled to open away from said other channel and the limbs of said other channel are angled outwardly, before extending inwardly, to provide abutment faces adjacent the ends of the recess-forming limbs.

In a vehicle seat slide mechanism, said stationary member is the vehicle floor and said movable member is the vehicle seat.

Preferably, roller means are provided between said channels. Said roller means may include side rollers between said limbs of the channels in which case the channels are adapted to deform around said side rollers under abnormal load to effect direct contact between the limbs of the channels.

Said roller means may comprise at least one set of roller elements comprising a central roller having convex end faces and a pair of side rollers. In this case, the limbs of said one channel extend inwardly to bear on said convex end faces and then outwardly to provide outwardly angled races for said side rollers, and the limbs of said other channel extend outwardly to provide a pair of angled faces adjacent the ends of the limbs of said one channel and then inwardly to provide complementary races for said side rollers.

Said central roller may be spherical or may comprise a waisted body having generally conical end faces.

The position of the upper channel may be controlled by a spring-loaded latching mechanism in which locating tongues enter openings in the lower channel. Alternatively, fluid-operated piston and cylinder means may be provided to control the longitudinal position of said second channel, the piston of said means being secured to one of said channels and the cylinder of said means being secured to the other of said channels, and at least one control valve is provided to control fluid flow to and from said piston and cylinder means.

Other objects and advantages of the invention will become apparent from the following description of preferred embodiments.

BRIEF DESCRIPTION OF THE DRAWINGS

FIG. 1 is a diagrammatic section which shows the arrangement of the principal components of a slide mechanism according to the invention;

FIG. 2 is a partly sectional end elevation of one of the pairs of tracks of the seat slide mechanism shown in FIG. 1;

FIG. 3 is a side elevation corresponding to FIG. 2, but on a smaller scale;

FIG. 4 is a partly sectional end view of one of the tracks of another form of vehicle seat slide mechanism according to the invention; and, FIG. 5 is a diagrammatic cross-section of one of the tracks of a further form of seat slide mechanism according to the invention.

DESCRIPTION OF PREFERRED EMBODIMENT

Referring to FIG. 1 of the drawings, the seat slide mechanism has a pair of parallel tracks each of which comprises a sheet-steel upper channel 10 secured through its base 11 to the underside of vehicle seat 12, and a sheet-steel lower channel 13 secured through its base 14 to floor 15 of the vehicle.

The upper channel 10 comprises the base 11 and a pair of limbs or walls 16 which curve downwardly and inwardly and provide bearing surfaces 17, and then outwardly to provide inclined lower roller races 18. The lower channel 13 comprises the base 14 and a pair of limbs or walls 19 which extend upwardly to provide outwardly inclined faces 20 and then inwardly and downwardly to provide complementary upper roller races 21.

Two sets of roller elements are provided, each set comprising a central ball 22 for which the base 14 of channel 13 provides a race, and a pair of cylindrical side rollers 23 for which the channel limbs provide the races 18 and 21. The central ball 22 provides faces 24 against which the limb surfaces 17 bear. Each ball 22 and its associated side rollers 23 are interconnected by a spring-steel cage indicated at 25.

The balls 22 may roll between limiting abutments 26 in the lower channel 13, and the position of the upper channel 10 is controlled by a latching mechanism 27 (FIGS. 2 and 3). The latching mechanism is carried by the upper channel and includes an axial rod 28 which can be turned by means of an end handle 29. The rod 28 extends through a guide bearing 30 to a pivotal bracket 31 which is formed with three tongues 32. The tongues 32 are urged into selective engagement with a row of thirteen slots indicated at 33 in the lower channel 13, by means of a pair of coil springs 34 which act between the pivotal bracket 31 and a bracket 35 riveted to the upper channel 10.

From the sectional shape of the channels 10 and 13, it will be appreciated that the form of the limbs 16 and 19 produces an interlocking arrangement which acts against separation of the channels on impact such as would occur in a vehicle collision. This will now be explained with reference to the right-hand track shown in FIG. 1. On impact, the two channels would tend to separate by channel 10 moving upwardly, and this would occur by bending of the channel limbs; in order for the channels to separate, bending must occur on at least one side of the centreline at points A or B in channel 10 and/or at points C and D in channel 13. Initially, under the action of the loads involved, the metal of the channel limbs will deform around rollers 23 to create contact faces between the channel limbs at approximately the planes containing the axes of rollers 23. This action prevents any further deformation of the limbs until separation starts. Separation is, however, prevented or at least retarded as the faces 24 of balls 22, which are engaged by surfaces 17, act to prevent rotation of points E about points A in channel 10. Furthermore, the deformation around the rollers 23 acts to prevent rotation about points C and D in channel 13, and the presence of the abutment faces 20 of limbs 19 prevents point F turning downwardly about points B.

As a result of the invention, therefore, separation of the channels is prevented or at least counteracted by the interlocking arrangement of the channel limbs 16 and 19 which occurs when the limbs deform round the rollers with which only a small part of the channel surface is normally in contact.

Referring now to the alternative form of slide shown in FIG. 4, it will be noted that central roller 40 comprises a waisted body part 41 and a pair of frusto-conical end faces 42 against which the limb surfaces 17 bear. Also, in this embodiment, the longitudinal position of the upper channels 10 is controlled hydraulically. For this purpose, a hydraulic cylinder 43 is secured to the upper channel 10 and extends longitudinally within the channel 10. A piston 44, slidable within the cylinder 43, is secured to a piston rod which is anchored at both ends to the lower channel 13, and it will be noted that the provision of the side rollers 23 leaves the major part of the base 14 unobstructed for bolts to secure the channel 10 to the seat 12.

Two connectors which are connected by by-pass pipes indicated at 45, are provided to allow fluid to pass from one side of the piston to the other on movement of the seat (with the piston 44). A control valve indicated at 46 is provided to control fluid flow through the by-pass pipes 45 of the slide mechanisms at both sides of the seat, and opening and closing of the control valve will act, respectively, to allow and to prevent movement of the channel 10, within fore-and-aft limits defined by indentations in lower channel base 14 and in the upper channel races. The hydraulic system minimises the danger of longitudinal separation of the channels, and also provides for simple and infinitely variable adjustment.

FIG. 5 shows a simplified form of slide mechanism in which the side rollers 23 are eliminated, and sliding occurs between the channel limbs 16 and 19 which are, of course, lubricated. As in the other embodiments of the invention, angled recesses 50 provided by the limbs 16 are entered by end lengths 51 of the limbs 19.

In a further alternative the central roller 40 or ball 22 is eliminated and the channels slidingly engage through their limbs, with or without the interposition of side rollers 23. In yet a further alternative the channels are inverted, channel 10 thus being secured to the vehicle floor and channel 13 to the vehicle seat.

The slide mechanism may also vary in dimensions and in the material, e.g., steel or aluminum alloy, depending on the use to which the mechanism is to be put. Although the slide mechanisms have been described above in relation to vehicle seats, other applications are possible, for instance in movable shelving.

I claim:

1. A slide mechanism comprising a first channel having a base adapted to be secured to a movable member, a second channel in sliding engagement with said first channel and having a base adapted to be secured to a stationary member, and central roller means between said channels and having convex end faces, one of said channels having limbs which extend inwardly to bear on said convex faces and then outwardly to terminate in ends and provide a pair of recesses which are angled to open away from said other channel, and the other of said channels having limbs which provide abutment faces adjacent said ends of the recessforming limbs and then extend inwardly to enter said recesses and interlock to resist separation of said channels.

2. A slide mechanism as claimed in claim 1, in which said limbs of said other channel are angled outwardly before extending inwardly and entering said recesses to provide said abutment faces with correspondingly angled form.

3. A slide mechanism as claimed in claim 1, and further comprising side roller means between said limbs of said channels, and in which said channels are adapted to deform around said side rollers under abnormal load to effect direct contact between the limbs of said channels.

4. A slide mechanism as claimed in claim 3, in which said central roller means and said side roller means comprise a plurality of sets of roller elements, each set comprising a central roller having convex end faces, a pair of side rollers, and a cage interconnecting said central and side rollers.

5. A slide mechanism as claimed in claim 2, in which said limbs of said one channel have end lengths which provide outwardly angled races for said side roller means, and said limbs of said other channel have end lengths which provide complementary angled races for said side roller means.

6. A slide mechanism as claimed in claim 1, in which said central roller means comprise a plurality of spherical rollers.

7. A slide mechanism as claimed in claim 1, in which said central roller means comprise a plurality of rollers each of which comprises a waisted body and generally conical end faces.

8. A slide mechanism as claimed in claim 2, in which said side roller means comprise a plurality of cylindrical rollers.

* * * * *